US012286225B2

(12) United States Patent
Bonnoit et al.

(10) Patent No.: US 12,286,225 B2
(45) Date of Patent: *Apr. 29, 2025

(54) FAST PATH PLANNING FOR DYNAMIC AVOIDANCE IN PARTIALLY KNOWN ENVIRONMENTS

(71) Applicant: Aurora Flight Sciences Corporation, a subsidiary of The Boeing Company, Manassas, VA (US)

(72) Inventors: Craig John Bonnoit, Vienna, VA (US); Jeffery Saunders, Quincy, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,022

(22) Filed: Feb. 8, 2024

(65) Prior Publication Data

US 2024/0239484 A1  Jul. 18, 2024

Related U.S. Application Data

(63) Continuation of application No. 17/447,540, filed on Sep. 13, 2021, now Pat. No. 11,999,479.

(51) Int. Cl.
*G05D 1/693* (2024.01)
*B64C 39/02* (2023.01)
(Continued)

(52) U.S. Cl.
CPC ........ *B64C 39/024* (2013.01); *G01C 21/3807* (2020.08); *G05D 1/1064* (2019.05);
(Continued)

(58) Field of Classification Search
None
See application file for complete search history.

(56) References Cited

U.S. PATENT DOCUMENTS 3,916,387 A * 10/1975 Woodrum ........... G06F 16/9027
11,999,479 B2 * 6/2024 Bonnoit ............... G08G 5/0052
(Continued)

OTHER PUBLICATIONS

Chandar, "Sparse Graph Codes for Compression, Sensing and Secrecy," MIT, Jun. 2010, 212 pages.
(Continued)

*Primary Examiner* — Peter D Nolan
*Assistant Examiner* — Jacob Kent Besteman-Street
(74) *Attorney, Agent, or Firm* — MH2 Technology Law Group LLP (57) ABSTRACT

Techniques for traversing in an environment that includes at least one obstacle, by a mobile autonomous system, to a destination in the environment, are presented. The techniques can include generating, prior to the mobile autonomous system commencing activity in the environment, a graph including a plurality of vertices representing positions in the environment and a plurality of edges between vertices representing feasible transitions by the mobile autonomous vehicle in the environment; annotating the graph with at least one edge connecting a representation of a present position of the mobile autonomous system to a vertex of the graph; determining, based on the graph, a path from the present position of the mobile autonomous system in the environment to the destination; and traversing the environment to the destination, by the mobile autonomous system, based on the path.

20 Claims, 7 Drawing Sheets

(51) Int. Cl.
*G01C 21/00* (2006.01)
*G05D 1/00* (2024.01)
*G06Q 10/047* (2023.01)
*G06Q 10/0631* (2023.01)
*G06Q 50/40* (2024.01)

(52) U.S. Cl.
CPC ........... *G05D 1/693* (2024.01); *G06Q 10/047* (2013.01); *B64U 2201/10* (2023.01); *G06Q 10/06313* (2013.01); *G06Q 50/40* (2024.01)

(56) References Cited

U.S. PATENT DOCUMENTS

| | | | |
|---|---|---|---|
| 2009/0210109 A1* | 8/2009 | Ravenscroft | G01C 21/20 701/25 |
| 2012/0044265 A1* | 2/2012 | Khorashadi | H04W 4/024 345/641 |
| 2012/0158280 A1* | 6/2012 | Ravenscroft | G08G 5/0034 701/400 |
| 2015/0304207 A1* | 10/2015 | Axnas | H04L 45/124 370/238 |
| 2016/0210863 A1* | 7/2016 | Kohn-Rich | G08G 5/0034 |
| 2017/0116863 A1* | 4/2017 | Valls Hernández et al. | G08G 5/006 |
| 2018/0114449 A1* | 4/2018 | Kohn-Rich | G05D 1/042 |
| 2020/0117220 A1* | 4/2020 | Paglieroni | G08G 5/0013 |
| 2020/0302662 A1* | 9/2020 | Homayounfar | G06V 10/454 |
| 2021/0134167 A1* | 5/2021 | Erignac | G05D 1/0088 |
| 2022/0114103 A1* | 4/2022 | Miller | G06F 12/0875 |

OTHER PUBLICATIONS

Chen et al., "An Ant Colony System Algorithm for Path Planning in Sparse Graphs," IEEE International Conference on Intelligent and Advance Systems, 2007, 6 pages.

Karaman et al., "Sampling-based Algorithms for Optimal Motion Planning," Laboratory for Information and Decision Systems, MIT, May 5, 2011, 76 pages.

Extended European Search Report issued on Feb. 6, 2023 in corresponding European Application No. 22184268.5, 7 pages.

Communication pursuant to Article 94(3) EPC issued on Feb. 7, 2024 in corresponding European Application No. 22184268.5, 5 pages.

\* cited by examiner

FAST PATH PLANNING FOR DYNAMIC AVOIDANCE IN PARTIALLY KNOWN ENVIRONMENTS

RELATED APPLICATION

This application is a continuation of U.S. application Ser. No. 17/447,540, entitled, "FAST PATH PLANNING FOR DYNAMIC AVOIDANCE IN PARTIALLY KNOWN ENVIRONMENTS," and filed Sep. 13, 2021, which is hereby incorporated by reference herein in its entirety.

FIELD

The subject matter described herein generally relates to path planning for a vehicle such as an aircraft.

BACKGROUND

One of the core capabilities of a computer controlled vehicle is path planning, which specifies a configuration of the vehicle over space and time. Such a plan can then be converted into commands to the vehicle's actuation and ultimately tracked and realized in the physical world (subject to uncertainty). The path planning problem is formalized by definition of goals characterizing what an operator wants the vehicle to do and dynamic feasibility characterizing what the vehicle can do. These components may be designed to incorporate constraints as well. The constraints can include physical limitations, operational rules, and safety considerations. Applications of the path planning problem include computing paths to a goal that avoid collision with obstacles of known extent and are minimal with respect to time, distance, or risk. This is itself a NP-complete problem if the system dynamics pose a holonomic constraint.

The current state of the art for path planning relies on rapidly exploring random algorithms. For vehicles in dynamic environments, these algorithms operate on an online basis in soft real time and create a log-sparse graph corresponding to feasible paths that a vehicle can take through space. The planning problem is then posed as search over the space of such graphs, and state of the art algorithms make use of dynamic programming to efficiently determine optimal paths. However, the graph creation step is computationally limiting in practice, as generating large graphs in this manner requires an excessive amount of time. Accordingly, only small and shallow graphs are created, which can result in path planning algorithms that fail to converge to near-optimal solutions and lead to abnormal and unacceptable system behavior.

SUMMARY

According to various examples, a method of traversing in an environment that includes at least one obstacle, by a mobile autonomous system, to a destination in the environment, is presented. The method includes generating, prior to the mobile autonomous system commencing activity in the environment, a graph comprising a plurality of vertices representing positions in the environment and a plurality of edges between vertices representing feasible transitions by the mobile autonomous vehicle in the environment; annotating the graph with at least one edge connecting a representation of a present position of the mobile autonomous system to a vertex of the graph; determining, based on the graph, a path from the present position of the mobile autonomous system in the environment to the destination; and traversing the environment to the destination, by the mobile autonomous system, based on the path.

Various optional features of the above method include the following. The vertices may store location and direction information. The vertices may store respective costs to the destination. The vertices may store identifications of next vertices in traversing to the destination. The at least one obstacle may include at least one dynamic obstacle. The method may further include invalidating at least one edge in the graph to represent a position of the at least one obstacle at a particular time. The annotating the graph with the at least one edge may include adding to the graph the at least one edge without generating a new memory allocation on an order of a size of the graph. The mobile autonomous system may include an aircraft. The destination may include a plurality of locations, and the graph may represent the plurality of locations by a plurality of vertices. The determining the path may include performing a non-exhaustive search of the graph.

According to various examples, a system for traversing in an environment that includes at least one obstacle, by a mobile autonomous system, to a destination in the environment, is presented. The system includes an electronic processor; electronic persistent memory comprising instructions that, when executed by the electronic processor, configure the electronic processor to perform operations comprising: generating, prior to the mobile autonomous system commencing activity in the environment, a graph comprising a plurality of vertices representing positions in the environment and a plurality of edges between vertices representing feasible transitions by the mobile autonomous vehicle in the environment; annotating the graph with at least one edge connecting a representation of a present position of the mobile autonomous system to a vertex of the graph; and determining, based on the graph, a path from the present position of the mobile autonomous system in the environment to the destination; wherein the mobile autonomous system is configured to traverse the environment to the destination based on the path.

Various optional features of the above system include the following. The vertices may store location and direction information. The vertices may store respective costs to the destination. The vertices may store identifications of next vertices in traversing to the destination. The at least one obstacle may include at least one dynamic obstacle. The operations may further include invalidating at least one edge in the graph to represent a position of the at least one obstacle at a particular time. The annotating the graph with the at least one edge may include adding to the graph the at least one edge without generating a new memory allocation on an order of a size of the graph. The mobile autonomous system may include an aircraft. The destination may include a plurality of locations, and the graph may represent the plurality of locations by a plurality of vertices. The determining the path may include performing a non-exhaustive search of the graph.

BRIEF DESCRIPTION OF THE DRAWINGS

The above and/or other aspects and advantages will become more apparent and more readily appreciated from the following detailed description of examples, taken in conjunction with the accompanying drawings, in which.

DETAILED DESCRIPTION

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

Some examples overcome the computation time and graph size bottlenecks of existing path planning techniques. Some examples are particularly suited for problem instances with a mixed structure that includes both known static hazards and dynamically observed hazards. In such cases, some examples allow for the use of graphs that are orders of magnitude larger (for equivalent computational work) than what are currently used. This allows examples to quickly compute solutions that are both locally and globally performant. Conversely, for a fixed requirement on expressive capacity, some examples provide improved runtime and faster closing of control loop. This allows a vehicle to more readily adapt to new information without losing sight of long-run goals.

Examples may be utilized with a variety of vehicles in a variety of environments. Environments may be three-dimensional, e.g., for airspace or underwater path planning, or two-dimensional, e.g., for ground or sea surface path planning. Example vehicles include aircraft, ships, submarines, automobiles, trucks, factory robots, unmanned ariel, submersible, and terrestrial vehicles, and any other vehicle that is autonomous or that can be controlled by a computer autonomously or semi-autonomously.

Some examples are particularly relevant for scenarios in which the implications of local maneuvering affect long-run mission feasibility. One example of this sort of mixed objective is the safe maneuvering of an energetically constrained vehicle such as an electric vertical takeoff and landing (eVTOL) airplane around hazards such as birds or other aircraft, in which case proximate collision avoidance must be balanced against long run energetic limitations necessary to safely land while avoiding known terrain and hazards. A second example is a strongly underactuated vehicle such as a high-altitude glider, which might need to balance dynamism to harness energy from locally observed wind gusts with station keeping to a sufficient degree for long run mission success.

Figure 1:
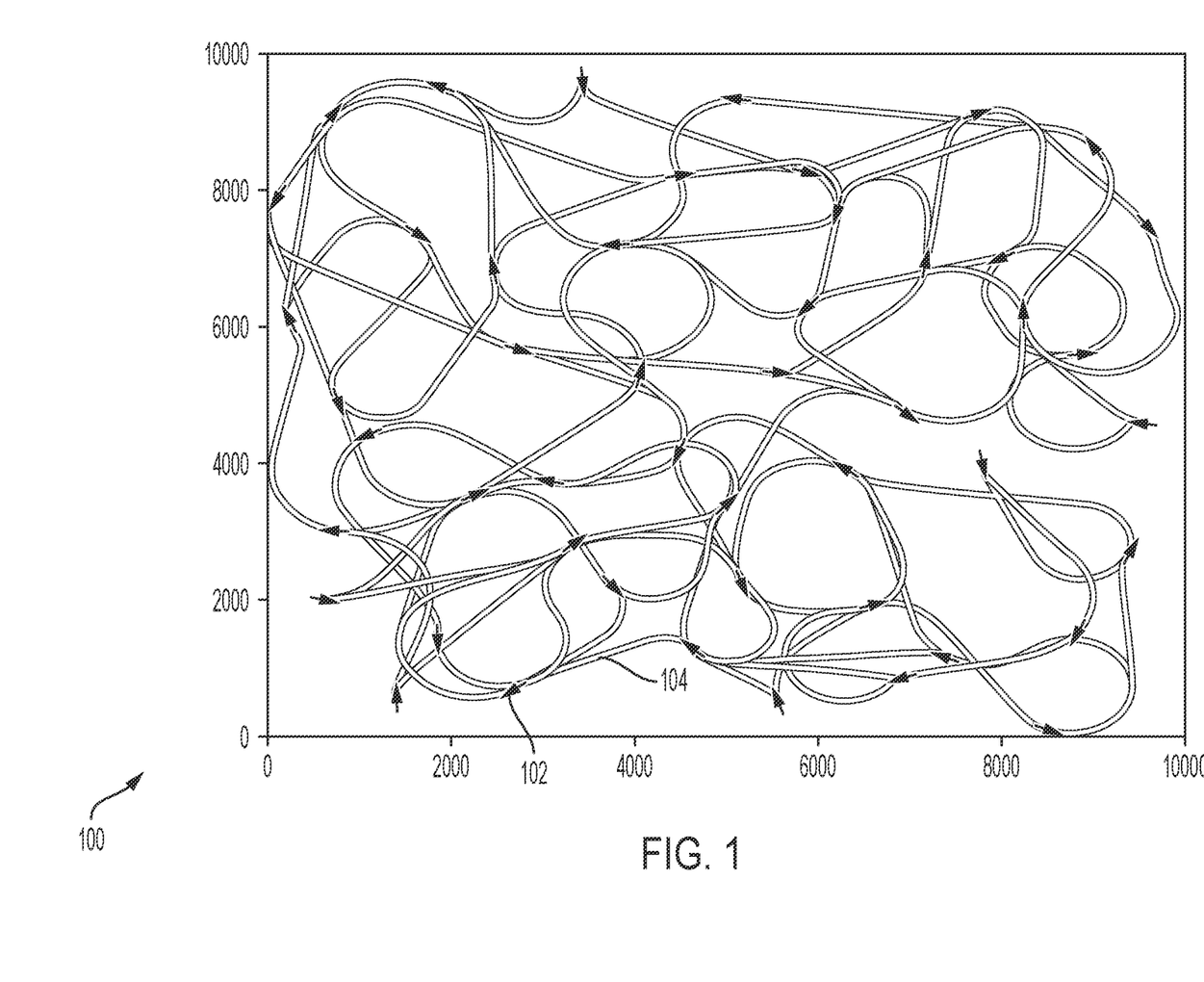
FIG. 1 depicts an example offline graph according to various examples.
Figure 2:
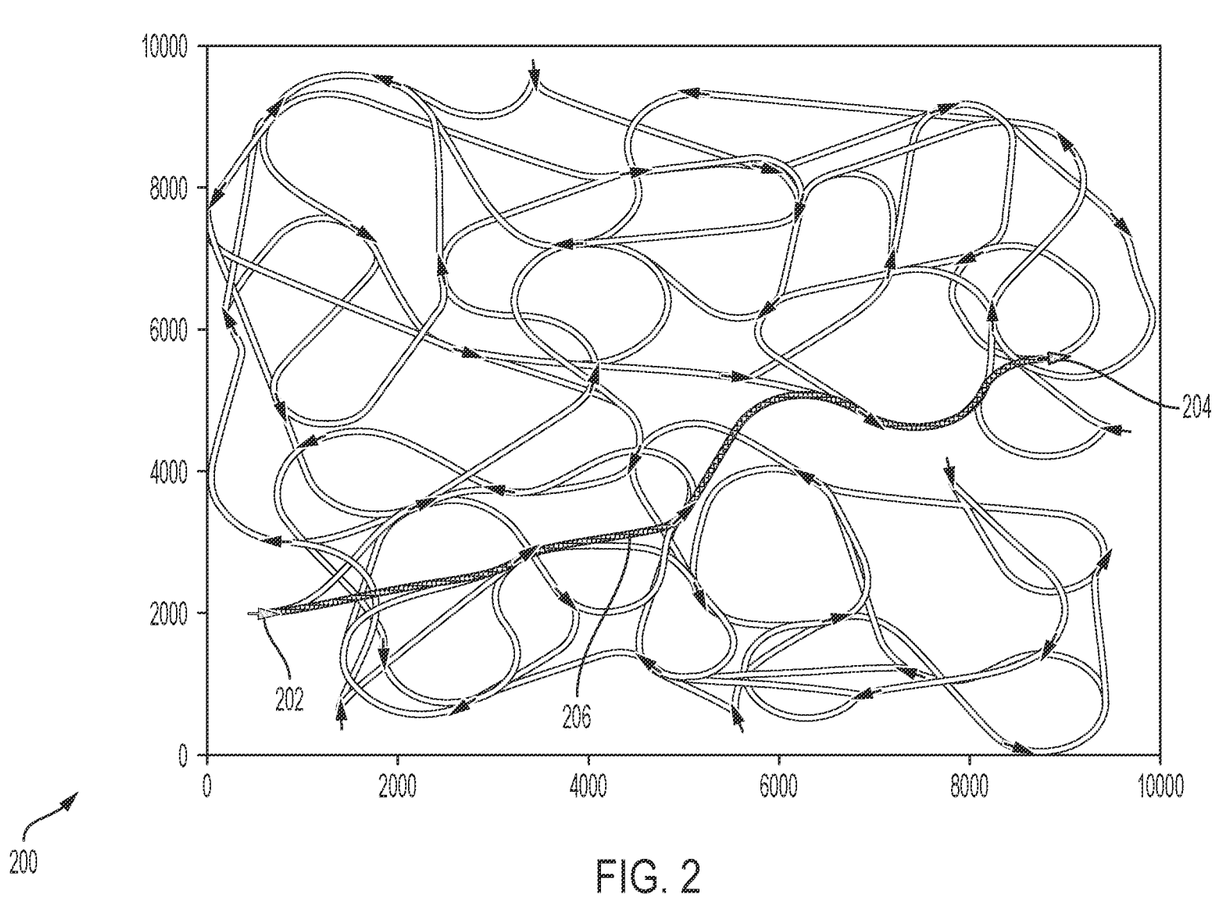
FIG. 2 depicts the example augmented offline graph of FIG. 1, including a minimal path from a starting position to a destination according to various examples.
Figure 3:
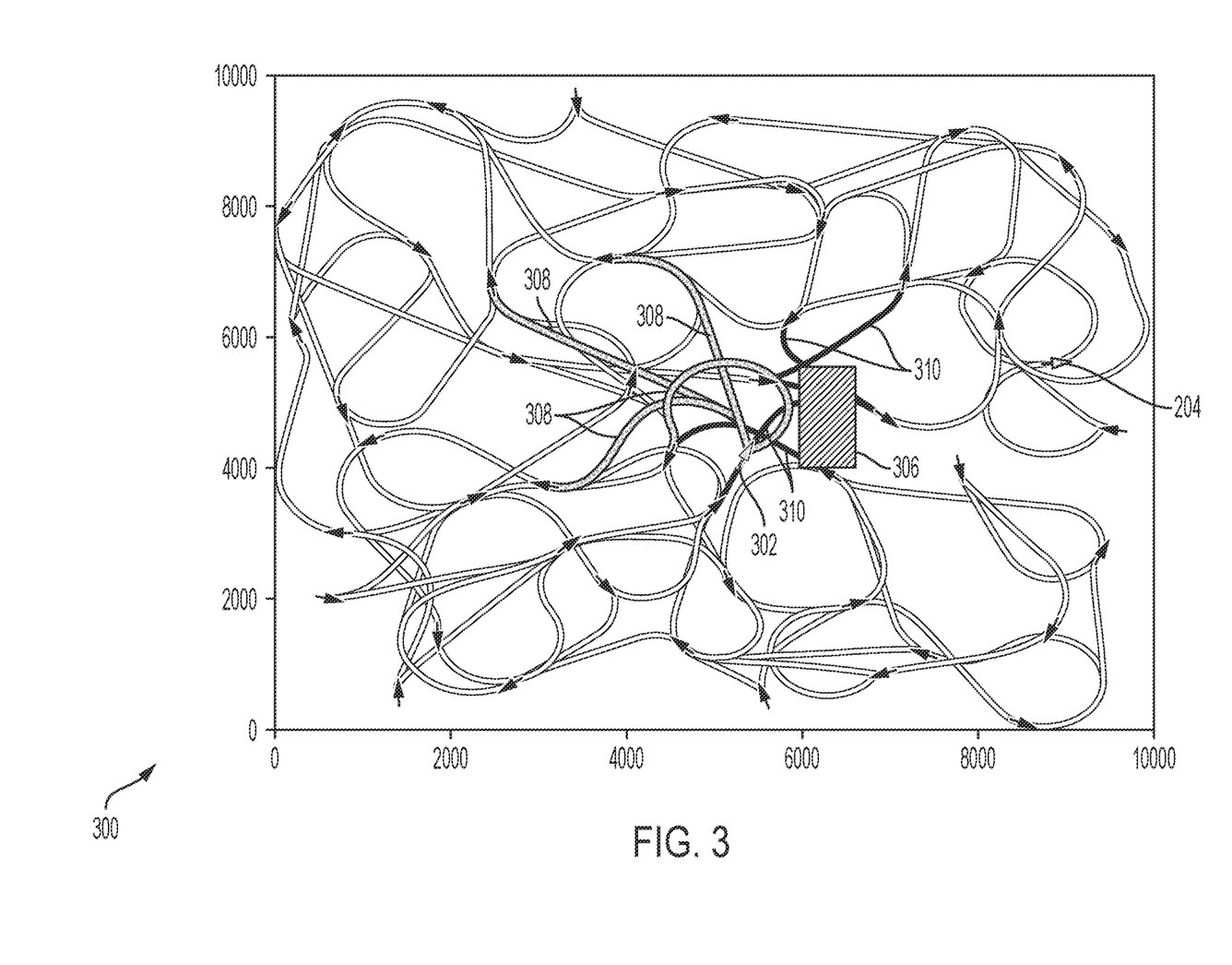
FIG. 3 depicts an example online graph according to various examples.
Figure 4:
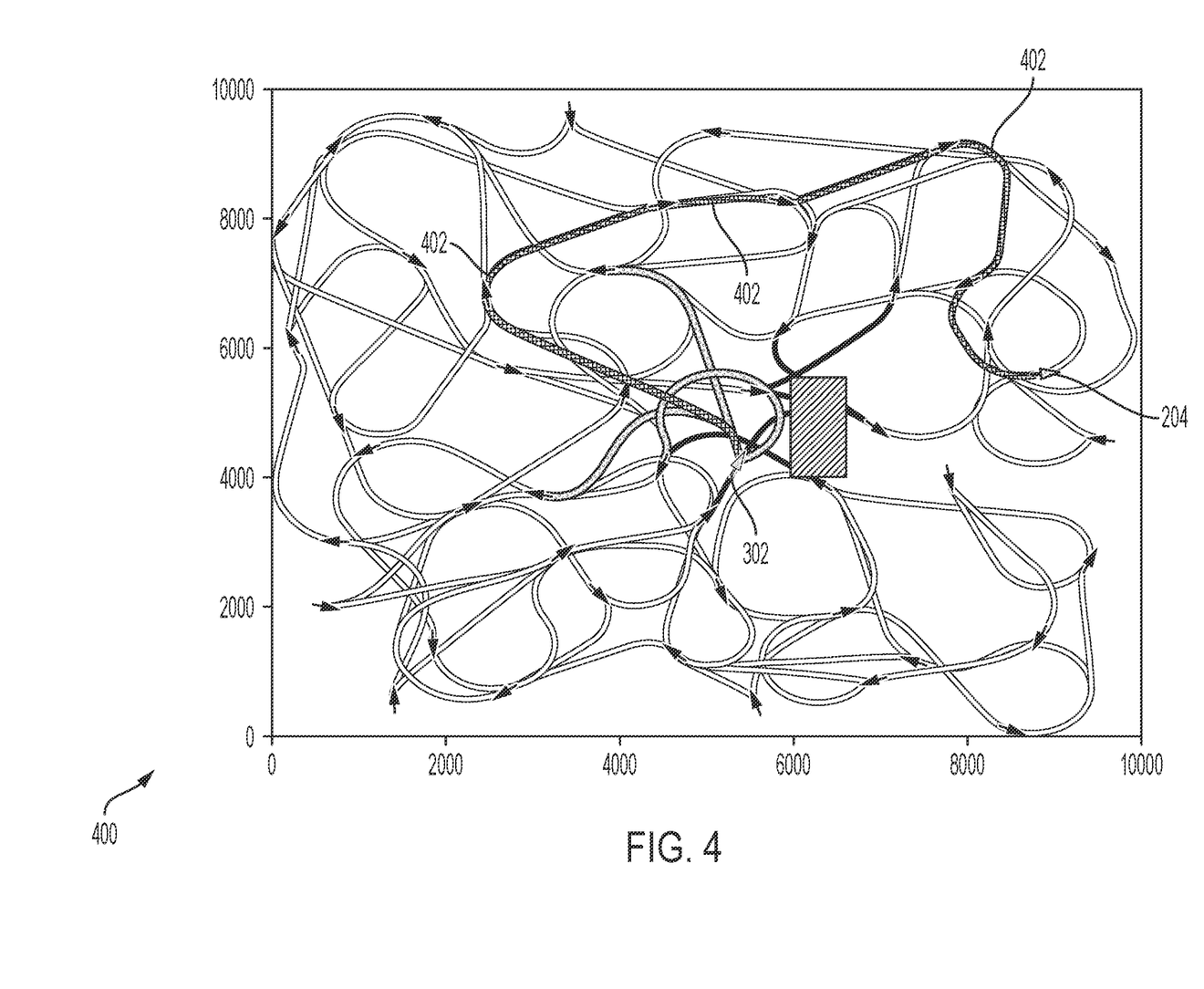
FIG. 4 depicts an online graph, representing the example online graph of FIG. 3, and showing a minimal path from the current location of the vehicle to the destination, according to various examples.

In general, examples may include an offline portion and an online portion. The offline portion may be executed prior to the vehicle operating in the environment under consideration, and the online portion may be executed during the vehicle's operation in the environment under consideration. The offline portion can include generating an offline graph that represents relations between reachable configurations that avoid static and otherwise known obstacles and satisfy operational constraints. An example offline graph is depicted in FIG. 1. The offline portion can further include augmenting the offline graph with vertex-wise information on the minimal cost paths and next vertex information. An example such augmented offline graph is depicted in FIG. 2. The online portion can include generating an online graph that includes at least one edge connecting a current position of the vehicle to a vertex in the offline graph. An example such an online graph is depicted in FIG. 3. The online portion can also include augmenting the online graph to evaluate if an edge is blocked by one or more previously unobserved obstacles. An example such an augmented online graph is depicted in FIG. 3. The online portion can further include searching for an updated minimal path subject to the one or more previously unobserved obstacles. The results of an example such search are depicted in FIG. 4.

These and other elements, features, and advantages are shown and described presently in reference to FIGS. 1-7.

FIG. 1 depicts an example offline graph 100 according to various examples. Offline graph 100 may include a representation of a known starting location and/or a known destination, e.g., by way of non-limiting examples, an origin airport and/or a destination airport. More generally, offline graph is populated with vertices, e.g., vertex 102, that each represent a state that includes both location and direction.

The points used to seed offline graph 100, e.g., the points that are to be used for the location portion of the vertices, can be selected according to any of a variety of techniques. By way of non-limiting examples, such points may be selected randomly, by using a deterministic space filling algorithm, or to align with existing procedural or operational structures (e.g., known fixes, airways, or approaches in an airspace system). Offline graph 100 may include, for example, at least 100,000 vertices.

Each vertex in the graph includes both positional and velocity degrees of freedom, representing location and direction with speed, respectively. Various examples may use any mixture of such states, e.g., position, heading, and airspeed for an aircraft. Although offline graph 100 represents two-dimensional space, examples are not so limited. Offline graphs (and other graphs disclosed herein) representing three-dimensional space are contemplated. For example, in three dimensions, each vertex may include two three-tuples, e.g., $(x_1, y_1, z_1)$, $(x_2, y_2, z_2)$, with one representing position and another representing orientation. Thus, for three dimensions, each vertex may include two three-dimensional vectors. In two dimensions, each vertex may include two pairs, e.g., $(x_1, y_1)$, $(x_2, y_2)$, with one representing position and another representing orientation; in two dimensions, each vertex may include two two-dimensional vectors. In sum, each vertex in offline graph 100 includes both a location and a direction. When clear from context, vertices may be referred to as states, which includes both location and direction, or as locations, which refers to the location portion. Whether two-dimensional or three-dimensional, offline graph 100 may include an added dimension (e.g., added to each of the respective three-tuples or pairs) to represent time.

Edges between vertices in offline graph 100, e.g., edge 104, represent feasible transitions between states (e.g., locations and directions) respecting known constraints. Feasible transitions can take into account, for example physical limitations of the vehicle, such as turning radius, and constraints can take into account known obstacles. In general, offline graph 100 may be a log sparse graph, with |EDGES|=|VERTICES| log|VERTICES|.

Offline graph 100 may be generated offline, prior to the vehicle operating in the space represented by offline graph 100. Offline graph 100 may be stored electronically in persistent computer-readable media, for example. In particular, offline graph 100, as well as the other graphs disclosed herein, may be stored in any suitable graph storage data structure, modified to store various data as disclosed herein, e.g., shortest path and successor vertex data as described in reference to FIG. 2, in association with the vertices.

FIG. 2 depicts an example augmented offline graph 200, in particular, an augmentation of offline graph 100 of FIG. 1, including a minimal path 206 from a starting location 202 to a destination location 204, according to various examples. Starting location 202 and destination location 204 may each be represented by a respective vertex in augmented offline graph 200, indicating both location and direction for each. Each vertex in augmented offline graph 200 further includes a representation of a cost to destination state 203, e.g., a minimal cost. Thus, each vertex may be augmented with a scalar value representing such a cost. Herein, "cost" may be implemented in a variety of forms and may represent time, distance, fuel expense, or any combination thereof. Further, each vertex may be augmented with an identification of a successor vertex in a path, e.g., a minimal cost path, to destination state 204. The identification of the successor vertex may take any of a variety of forms, e.g., an index of a vertex, where the vertices of augmented offline graph 200 are indexed by some enumeration, for example.

As shown, augmented offline graph 200 includes minimal cost path 206 from starting state 202 to destination state 204. Such a path may be obtained using a variety of techniques, e.g., dynamic programming applied to the costs to the destination stored at the vertices. Example suitable dynamic programming techniques include Dijkstra's algorithm and A*.

FIG. 3 depicts an example online graph 300 according to various examples. Online graph 300 may be constructed from an augmented offline graph, and is described by way of non-limiting example in reference to augmented offline graph 200 of FIG. 2. Relative to the offline portion of various examples, for the online portion, when the vehicle is present in the environment under consideration, two things may change. First, the current location 302 of the vehicle may be at an arbitrary position, e.g., not at a location represented by a vertex of augmented offline graph 200. Second, one or more previously unknown obstacles, such as obstacle 306, may be present. These changes may be addressed as follows. First, new edges 308 that connect the current location 302 of the vehicle may be added. Second, edges 310 that cross obstacle 306 may be considered invalid. Such edges may not be considered when planning a path, but may be retained in the graph, e.g., for use when the obstacle is no longer present.

The current location 302 of the vehicle may be determined according to any of a variety of techniques, including, by way of non-limiting examples, GPS, satellite imaging, dead reckoning, and/or triangulation based on any of RADAR, SONAR, or LIDAR. The current location and direction form a state that may be joined to an existing vertex in online graph 300, where the existing vertex may be identified, for example, using a nearest neighbor search.

The new obstacles, such as obstacle 306, may be identified using any of a variety of techniques. Detection techniques include, by way of non-limiting example, ground-based, air-based, sea-based, and/or vehicle-based RADAR, SONAR, and LIDAR. Satellite imaging may be used. Information from any entity, such as an air traffic controller, that may utilize any of the aforementioned detection techniques or a different technique, may further be used to identify any new obstacles that appear in the environment under consideration.

Online graph 300 may include an added dimension to represent time. For example, for path planning in three dimensions, each vertex may include a three-dimensional location vector, a three-dimensional direction vector, and a scalar time value, all of which may be represented in seven dimensions, e.g., in $\mathbb{R}^7$. Further, each edge may be associated with a traversal duration. When planning in the presence of dynamic obstacles, time as a parameter may be used to evaluate if there is a potential collision. For example, if the current time is T and an edge in the graph is known to have duration D to traverse, then the state that may be reached by following that edge is ([location vector], [direction vector], T+D), which allows for an evaluation of whether there is a potential collision with the dynamic obstacle. The graph may be constructed lazily as-needed (with caching to prevent recalculation).

FIG. 4 depicts an online graph 400, representing the example online graph 300 of FIG. 3, and showing a minimal cost path 402 from the current location 302 of the vehicle to the destination 204, according to various examples. Minimal path 402 may be obtained using any of a variety of search algorithms applied to online graph 400, e.g., beam search. In particular, the search may use the cost to destination 203 stored at the vertices as a proximate metric to select the minimal cost path 402.

Figure 5:
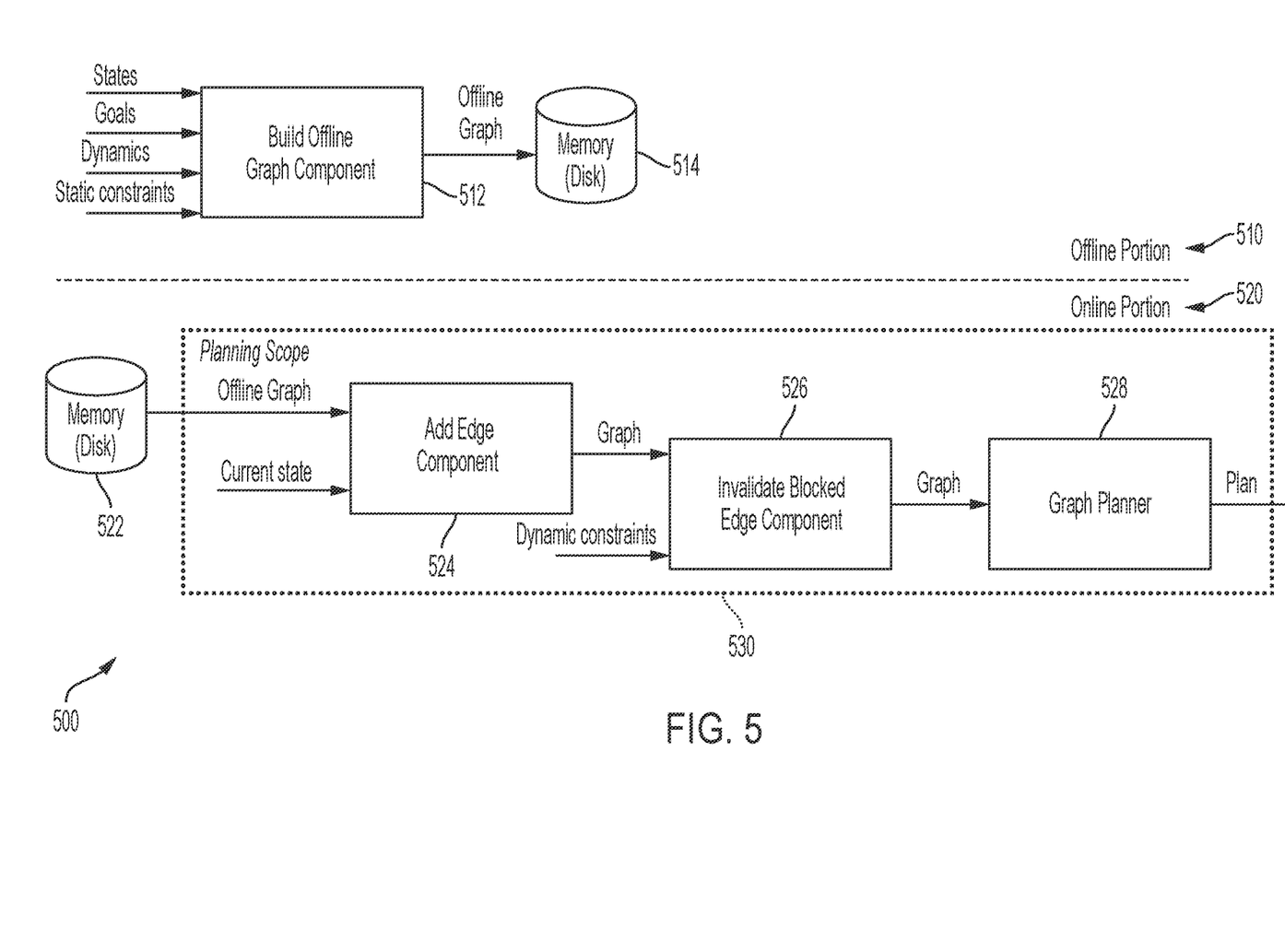
FIG. 5 is a block diagram of a path planning system according to various examples.

In sum, as shown and described herein in reference to FIGS. 1-4, a technique for path planning is presented. The technique includes an offline portion, prior to commencing vehicle operations in the area under consideration, in which an offline graph is generated. The offline graph may be implemented as a large log-sparse mobility graph representing relations between reachable configurations that avoid static and known obstacles and satisfy operational constraints. FIG. 1 depicts an example such offline graph. The offline portion may further include augmenting the offline graph with vertex-wise information on the minimal cost paths to the destination, e.g., by using dynamic programming. FIG. 2 depicts an example such augmented offline graph. The technique also includes an online portion, during vehicle activity in the area under consideration, that uses the augmented offline graph to generate an online graph. The online graph includes a connection of a current position of the vehicle to a vertex in the augmented offline graph. FIG. 3 depicts an example online graph with such a connection. The online graph further includes the ability to evaluate if an edge is blocked by any previously unobserved obstacle. FIG. 3 depicts an example online graph with such an ability. The online graph is then used to plan a path, e.g., by searching for a minimal path subject to previously unobserved obstacles. FIG. 4 depicts an example minimal path. FIG. 5, described presently, shows a system configured to perform the described technique.

FIG. 5 is a block diagram of a path planning system 500 according to various examples. System 500 divides the work required for path planning into actions performed by offline portion 510, which includes actions that may occur prior to vehicle operation in the area of interest, and actions performed by online 520 portion, which includes actions that may be performed during vehicle operation in the area of interest. In general, offline portion 510 generates an offline graph as a computational representation of mobility in a specific operational context. This can be done long before use is required to solve a specific planning problem from the context of a vehicle, and admits use of hardware parallelism and validation approaches that would not be otherwise computationally tractable in the runtime of planning. Online portion 520 generally concerns the enrichment and consumption of the offline graph within the area of operation during operation.

Offline portion 510 includes build offline graph component 512. Build offline graph component 512 provides an offline graph representing feasible connections between a set of states and a set of goals, subject to known dynamics and static time-invariant constraints. Build offline graph component 512 may augment each vertex of the offline graph with a minimal cost to go to the destination. Persisting such cost-to-go information over each vertex allows for the use of purely local O(1) greedy heuristics about reachability. Further, build offline graph component 512 may augment the offline graph with geometric information in each vertex representing path connections, e.g., a next vertex identification, to improve the speed at which an edge can be evaluated as intersecting a known obstacle. Once constructed by build offline graph component 512, the offline graph may be stored in persistent storage 514 for consumption during the online portion.

System 500 also includes online portion 520. Online portion 520 includes planning scope 530, a runtime environment that supports persistent memory allocation to reuse the offline graph without reloading or reallocating from memory. Planning scope 530 may be used in a repeated context, including receding horizon planning or evaluation of multiple scenarios. Planning scope 530 may retrieve the offline graph from persistent storage 522, which may be the same or a different persistent storage from persistent storage 514.

Online portion 520 also includes add edge component 524, which adds at least one edge connecting a representation of a current location of the vehicle to a vertex in the offline graph. That is, add edge component 524 provides a graph interface representing the online graph inclusive of an arbitrary current location (e.g., a current state) connected onto the existing offline graph. The connection may be determined using a nearest neighbor search, for example. Add edge component 524 may provide an abstract graph view rather than a new full-size memory allocation in order to avoid memory operations on the order of the size of the graph (e.g., O(|VERTICES|)) during online portion 520. Such an abstract graph view may provide a function that can, for example, identify all successors of an input vertex identification. Such a function may operate on a small portion of the graph without requiring the entire graph to be held in dynamic memory. Further, such a function may store a temporary list of vertices that have previously been evaluated by the function and their successors, such that future evaluations of the function at such vertices may be performed using a fast lookup call.

Online portion 520 further includes invalidate blocked edge component 526. Invalidate blocked edge component 526 provides a graph interface representing an offline graph inclusive of known dynamic constraints, including moving objects known during the online portion. Invalidate blocked edge component 526 may employ halfspace inclusion or polytope intersection together with next vertex information to detect whether a dynamic or static constraint blocks an edge. If so, blocked edge component 526 removes the edge from being used in computations at later stages. Blocked edge component 526 may keep an electronically stored list of blocked edges in memory according to some examples. Such a list may be checked prior to performing certain actions, such as performed by graph planner 528, and edges represented therein may be removed from the actions. Similar to add edge component 524, invalidate blocked edge component 526 may provide an abstract graph view rather than a new memory allocation in order to avoid memory operations on the order of the size of the graph during online portion 520.

Online portion 520 further includes graph planner 528. Graph planner 528 provides trajectories, paths, or plans, given goals. Graph planner 528 may implement any of a variety of algorithms, e.g., bounding (A*, D*) random search (e.g., Monte Carlo tree search), or heuristic search algorithms (e.g., beam search). Because the removing blocked edges from being used can increase the cost-to-go for vertices in a non-local manner, graph planner 528 may employ backtracking heuristic modifications. According to some examples, a beam search heuristic is used to balance runtime and optimality considerations. In particular, a logarithmically scaling beam width may be used, e.g., the beam width may be selected as c log|VERTICES|, where c is some constant. Graph planner 528 outputs a path from the current location of the vehicle to the destination.

Some examples minimize the amount of runtime work performed by online portion 520 through the use of various features. Such features may include (1) creating abstract view graphs instead of reallocating memory, and (2) updating cost-to-go lazily based on backtracking instead of exhaustively checking edges and performing computational work that scales extensively with number of edges. These two aspects in particular may provide performant and accurate planning with relatively low requirements on dynamic memory allocation and computational complexity at runtime.

Figure 6:
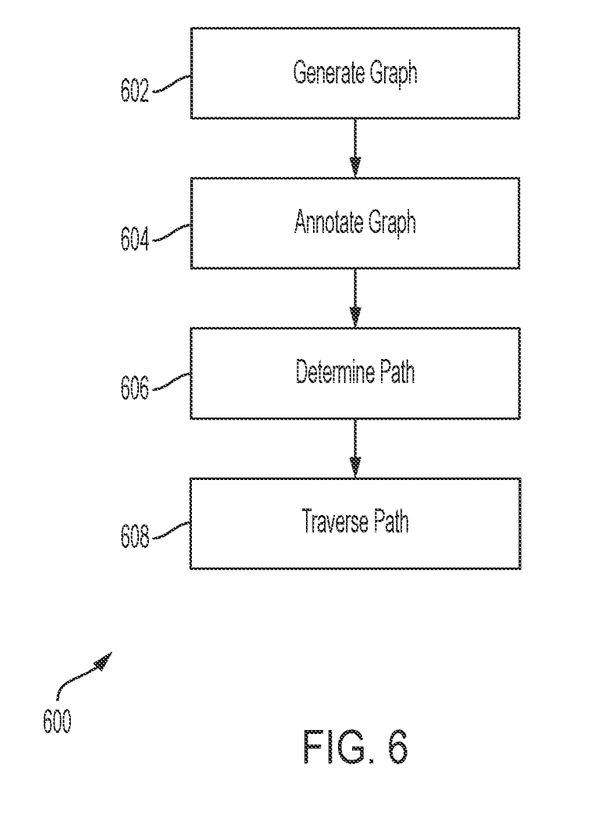
FIG. 6 is a flowchart for a method of path planning according to various examples.

FIG. 6 is a flowchart for a method 600 of path planning according to various examples. Method 600 may include a mobile autonomous system traversing an environment that includes at least one obstacle to a destination in the environment. Method 600 may be implemented by system 500 as shown and described in reference to FIG. 5 using hardware 700 as shown and described in reference to FIG. 7.

At 602, method 600 generates an offline graph. The offline graph may be generated prior to the mobile autonomous system commencing activity in the environment. The offline graph may include a plurality of vertices representing positions in the environment and a plurality of edges between vertices representing feasible transitions by the mobile autonomous vehicle in the environment. The actions of 602 may include any, or any combination, of actions as shown and described herein in reference to FIGS. 1 and 2 and in reference to build offline graph component 512 of FIG. 5.

At 604, method 600 includes annotating the graph with at least one edge connecting a representation of a present position of the mobile autonomous system to a vertex of the graph. The actions of 604 may include any, or any combination, of actions as shown and described in reference to FIG. 3 and in reference to add edge component 524 of FIG. 5.

At 606, method 600 includes determining, based on the graph, a path from the present position of the mobile autonomous system in the environment to the destination. The actions of 606 may include any, or any combination, of actions as shown and described in reference to FIG. 4 and in reference to graph planner 528 of FIG. 5.

At 608, method 600 includes traversing the environment to the destination, by the mobile autonomous system, based on the path. The actions of 608 may include the mobile autonomous system physically traversing in the environment to the destination using the path as a traversal route.

Figure 7:
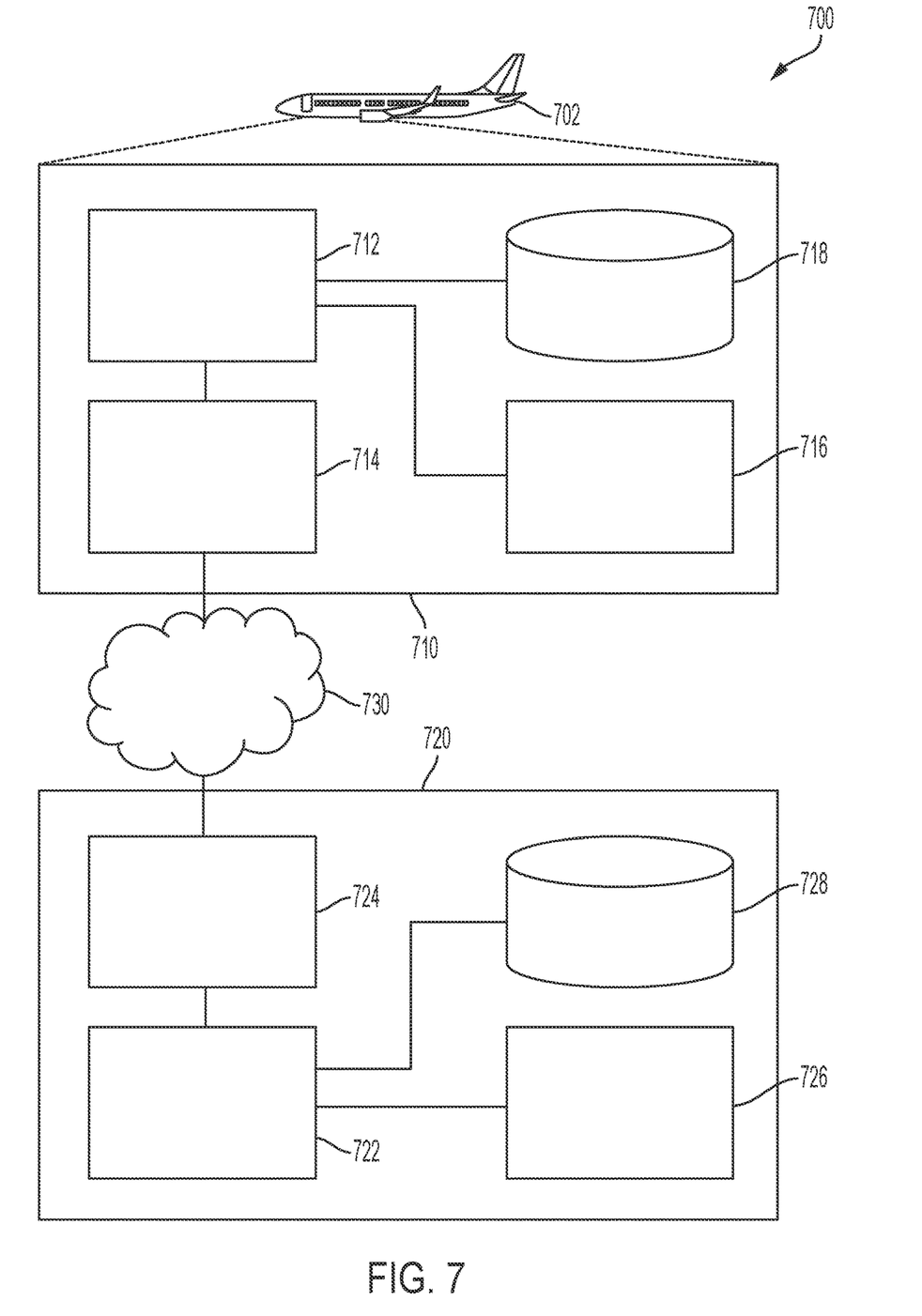
FIG. 7 is a block diagram of a example hardware for implementing various examples.

FIG. 7 is a block diagram of example hardware 700 for implementing various examples. For example, FIG. 7 illustrates various hardware, software, and other resources that can be used in implementations of method 600 as shown and described herein in reference to FIG. 6. Further, system 700 may implement build offline graph component 512, persistent storage 514, persistent storage 522, add edge component 524, invalidate blocked edge component 526, graph planner 528, and/or planning scope 530.

System 700 includes offline portion computer 720 and online portion computer 710. Offline portion computer 720 may perform offline portion actions, e.g., as shown and described herein in reference to FIGS. 1, 2, and 5. Online portion computer 710 may perform online portion actions, e.g., as shown and described herein in reference to FIGS. 3, 4, and 5. Online portion computer 710 may be deployed aboard the vehicle at issue, e.g., aircraft 702. Offline portion computer 710 and online portion computer 720 may be communicatively coupled by way of one or more networks 730, e.g., the internet.

Either of offline portion computer 720 or online portion computer 710 may be implemented as any of a desktop computer, a laptop computer, can be incorporated in one or more servers, clusters, or other computers or hardware resources, or can be implemented using cloud-based resources. Offline portion computer 720 includes volatile memory 726 and persistent memory 728, the latter of which can store computer-readable instructions, that, when executed by electronic processor 722, configure offline portion computer 720 to at least partially perform an offline portion of methods, e.g., method 600, as shown and described herein. Offline portion computer 720 includes network interface 724, which communicatively couples offline portion computer 720 to online portion computer 710 via network 730. Online computer 710 includes volatile memory 716 and persistent memory 718, the latter of which can store computer-readable instructions, that, when executed by electronic processor 712, configure online computer 710 to at least partially perform an online portion of methods, e.g., method 600, as shown and described herein. Online portion computer 710 includes network interface 714, which communicatively couples online portion computer 710 to offline portion computer 720 via network 730. Other configurations of system 700, associated network connections, and other hardware, software, and service resources are possible.

Many variations and modifications of the disclosed example examples are possible. According to some examples, the destination state could be replaced with a union of states, e.g., to represent dynamically choosing amongst several feasible landing locations or a range of admissible finishing states (such as in a holding pattern, in a declared safe landing zone, or at an airport). Note that the cost-to-go metric may remain scalar valued, assuming that the goals are to be treated as equivalent priority. According to some examples, the maneuverability graph may be replaced with a local template reflecting a sequence of maneuvers in cases for which translational invariance was present (such as for planning maneuvers in a dogfight in up and away flight). In this case, the offline actions may capture representations of how basic controllable actions can be composed into longer run maneuvers that are searched at runtime.

Clause 1. A method of traversing in an environment that includes at least one obstacle, by a mobile autonomous system, to a destination in the environment, the method comprising generating, prior to the mobile autonomous system commencing activity in the environment, a graph comprising a plurality of vertices representing positions in the environment and a plurality of edges between vertices representing feasible transitions by the mobile autonomous vehicle in the environment; annotating the graph with at least one edge connecting a representation of a present position of the mobile autonomous system to a vertex of the graph; determining, based on the graph, a path from the present position of the mobile autonomous system in the environment to the destination; and traversing the environment to the destination, by the mobile autonomous system, based on the path.

Clause 2. The method of Clause 1, wherein the vertices store location and direction information.

Clause 3. The method of Clause 1 or 2, wherein the vertices store respective costs to the destination.

Clause 4. The method of any of Clauses 1-3, wherein the vertices store identifications of next vertices in traversing to the destination.

Clause 5. The method of any of Clauses 1-4, wherein the at least one obstacle comprises at least one dynamic obstacle.

Clause 6. The method of any of Clauses 1-5, further comprising invalidating at least one edge in the graph to represent a position of the at least one obstacle at a particular time.

Clause 7. The method of any of Clauses 1-6, wherein the annotating the graph with the at least one edge comprises adding to the graph the at least one edge without generating a new memory allocation on an order of a size of the graph.

Clause 8. The method of any of Clauses 1-7, wherein the mobile autonomous system comprises an aircraft.

Clause 9. The method of any of Clauses 1-8, wherein the destination comprises a plurality of locations, and wherein the graph represents the plurality of locations by a plurality of vertices.

Clause 10. The method of any of Clauses 1-9, wherein the determining the path comprises performing a non-exhaustive search of the graph Clause 11. A system for traversing in an environment that includes at least one obstacle, by a mobile autonomous system, to a destination in the environment, the system comprising: an electronic processor; electronic persistent memory comprising instructions that, when executed by the electronic processor, configure the electronic processor to perform operations comprising: generating, prior to the mobile autonomous system commencing activity in the environment, a graph comprising a plurality of vertices representing positions in the environment and a plurality of edges between vertices representing feasible transitions by the mobile autonomous vehicle in the environment; annotating the graph with at least one edge connecting a representation of a present position of the mobile autonomous system to a vertex of the graph; and determining, based on the graph, a path from the present position of the mobile autonomous system in the environment to the destination; wherein the mobile autonomous system is configured to traverse the environment to the destination based on the path.

Clause 12. The system of Clause 11, wherein the vertices store location and direction information.

Clause 13. The system of Clause 11 or Clause 12, wherein the vertices store respective costs to the destination.

Clause 14. The system of any of Clauses 11-13, wherein the vertices store identifications of next vertices in traversing to the destination.

Clause 15. The system of any of Clauses 11-14, wherein the at least one obstacle comprises at least one dynamic obstacle.

Clause 16. The system of any of Clauses 11-15, wherein the operations further comprise invalidating at least one edge in the graph to represent a position of the at least one obstacle at a particular time.

Clause 17. The system of any of Clauses 11-16, wherein the annotating the graph with the at least one edge comprises adding to the graph the at least one edge without generating a new memory allocation on an order of a size of the graph.

Clause 18. The system of any of Clauses 11-17, wherein the mobile autonomous system comprises an aircraft.

Clause 19. The system of any of Clauses 11-18, wherein the destination comprises a plurality of locations, and wherein the graph represents the plurality of locations by a plurality of vertices.

Clause 20. The system of any of Clauses 11-19, wherein the determining the path comprises performing a non-exhaustive search of the graph.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method of traversing in an environment, by a vehicle, to a destination in the environment, the method comprising:
   generating, prior to the vehicle operating in the environment, a graph comprising a plurality of vertices representing positions in the environment and a plurality of edges between vertices representing feasible transitions by the vehicle in the environment, wherein the vertices store identifications of next vertices in traversing to the destination;
   determining, while the vehicle is operating in the environment and based on the graph, a path from a present position of the vehicle in the environment to the destination; and
   traversing the environment to the destination, by the vehicle, based on the path.

2. The method of claim 1, wherein the vertices further store location information.

3. The method of claim 1, wherein the vertices further store respective costs to the destination, wherein the respective costs comprise fuel expense.

4. The method of claim 1, wherein the graph is log-sparse.

5. The method of claim 1, wherein the environment comprises at least one dynamically observed obstacle.

6. The method of claim 5, further comprising invalidating at least one edge in the graph to represent a position of the at least one dynamically observed obstacle at a particular time.

7. The method of claim 1, further comprising, while the vehicle is operating in the environment, annotating the graph with at least one edge connecting a representation of the present position of the vehicle to a vertex of the graph.

8. The method of claim 1, wherein the vehicle comprises an aircraft.

9. The method of claim 1, wherein the destination comprises a plurality of locations, and wherein the graph represents the plurality of locations by a plurality of vertices.

10. The method of claim 1, wherein the determining the path comprises performing a non-exhaustive search of the graph.

11. A system for traversing in an environment, by a vehicle, to a destination in the environment, the system comprising:
    an electronic processor; and
    electronic persistent memory comprising instructions that, when executed by the electronic processor, configure the electronic processor to perform operations comprising:
    generating, prior to the vehicle operating in the environment, a graph comprising a plurality of vertices representing positions in the environment and a plurality of edges between vertices representing feasible transitions by the vehicle in the environment, wherein the vertices store identifications of next vertices in traversing to the destination; and
    determining, while the vehicle is operating in the environment and based on the graph, a path from a present position of the vehicle in the environment to the destination;
    wherein the vehicle is configured to traverse the environment to the destination based on the path.

12. The system of claim 11, wherein the vertices further store location information.

13. The system of claim 11, wherein the vertices further store respective costs to the destination, wherein the respective costs comprise fuel expense.

14. The system of claim 11, wherein the graph is log-sparse.

15. The system of claim 11, wherein the environment comprises at least one dynamically observed obstacle.

16. The system of claim 15, wherein the operations further comprise invalidating at least one edge in the graph to represent a position of the at least one dynamically observed obstacle at a particular time.

17. The system of claim 11, further comprising, while the vehicle is operating in the environment, annotating the graph with at least one edge connecting a representation of the present position of the vehicle to a vertex of the graph.

18. The system of claim 11, wherein the vehicle comprises an aircraft.

19. The system of claim 11, wherein the destination comprises a plurality of locations, and wherein the graph represents the plurality of locations by a plurality of vertices.

20. The system of claim 11, wherein the determining the path comprises performing a non-exhaustive search of the graph.

* * * * *